(12) United States Patent
Wang et al.

(10) Patent No.: US 9,872,355 B2
(45) Date of Patent: Jan. 16, 2018

(54) CONTROL CIRCUIT, CONTROL METHOD AND LED DRIVING CIRCUIT THEREOF

(71) Applicant: Silergy Semiconductor Technology (Hangzhou) LTD, Hangzhou, ZheJiang Province (CN)

(72) Inventors: Jianxin Wang, Hangzhou (CN); Huiqiang Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/494,708

(22) Filed: Apr. 24, 2017

(65) Prior Publication Data

US 2017/0318639 A1    Nov. 2, 2017

(30) Foreign Application Priority Data

Apr. 29, 2016 (CN) .......................... 2016 1 0286012
Sep. 6, 2016   (CN) .......................... 2016 1 0808778

(51) Int. Cl.
*H05B 33/08* (2006.01)

(52) U.S. Cl.
CPC ..... *H05B 33/0851* (2013.01); *H05B 33/0809* (2013.01); *H05B 33/0812* (2013.01); *H05B 33/0824* (2013.01)

(58) Field of Classification Search
CPC ........ H02M 1/42; H02M 1/4258; H02M 1/15; H02M 1/143; H02M 3/33507; H02M 7/1557; H02M 7/1626; H02M 7/1623; H02M 2001/0032; H05B 33/0815; H05B 33/083; H05B 33/0845; H05B 33/0836; H05B 33/0812; Y02B 20/347; Y02B 70/126
See application file for complete search history.

(56) References Cited

U.S. PATENT DOCUMENTS

| | | |
|---|---|---|
| 7,898,187 B1 | 3/2011 | Mei et al. |
| 8,614,551 B2 | 12/2013 | Chen et al. |
| 9,024,542 B2 | 5/2015 | Chen |
| 9,055,635 B2 | 6/2015 | Yu et al. |
| 9,192,007 B2 | 11/2015 | Zhang |
| 9,325,254 B2 | 4/2016 | Deng et al. |
| 9,413,248 B2 * | 8/2016 | Huang .................. H02M 1/12 |
| 9,520,796 B2 * | 12/2016 | Adragna ........... H02M 3/33523 |
| 9,564,795 B2 * | 2/2017 | Jin ........................ H02M 1/143 |
| 9,713,207 B2 * | 7/2017 | Jermyn ............. H05B 33/0815 |
| 2012/0262075 A1 * | 10/2012 | Lynch ................ H05B 33/0818 315/192 |
| 2016/0044759 A1 | 2/2016 | Lai et al. |
| 2016/0066378 A1 | 3/2016 | Wang et al. |

* cited by examiner

*Primary Examiner* — Haissa Philogene
(74) *Attorney, Agent, or Firm* — Michael C. Stephens, Jr.

(57) ABSTRACT

A control circuit for an LED driving circuit having a rectifier and a power transistor for driving an LED load, can include: a control signal regulation circuit configured to control a driving voltage of the power transistor to vary with a rectifier output voltage to control the variation of a current flowing through the power transistor to be consistent with that of the rectifier output voltage to decrease a power loss of the power transistor; and the control signal regulation circuit being configured to control the driving voltage of the power transistor to vary with the rectifier output voltage to control the variation of the current flowing through the power transistor to be opposite to that of the rectifier output voltage to improve a power factor of the LED driving circuit.

20 Claims, 6 Drawing Sheets

CONTROL CIRCUIT, CONTROL METHOD AND LED DRIVING CIRCUIT THEREOF

RELATED APPLICATIONS

This application claims the benefit of Chinese Patent Application No. 201610286012.4, filed on Apr. 29, 2016, and of Chinese Patent Application No. 201610808778.4, filed on Sep. 6, 2016, both of which are incorporated herein by reference in their entirety.

FIELD OF THE INVENTION

The present invention generally relates to the field of power electronics, and more particularly to LED control circuits and methods.

BACKGROUND

With increasingly use of light-emitting diode (LED) lights, multi-stage switching converters are typically used in order to adjust the brightness of the light sources. In addition, each stage may deal with the power in total, which can increase product costs of the LED drivers. In order to reduce the costs, some conventional techniques divide the secondary winding at the output side of a flyback converter into two groups, and a DC-DC converter of the second stage may be connected to only one of the two groups. In accordance one LED luminance system, in order to achieve current balance of each LED branch circuit, a linear regulator (LDO) can be coupled with the LED branch circuit to regulate the LED driving current.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
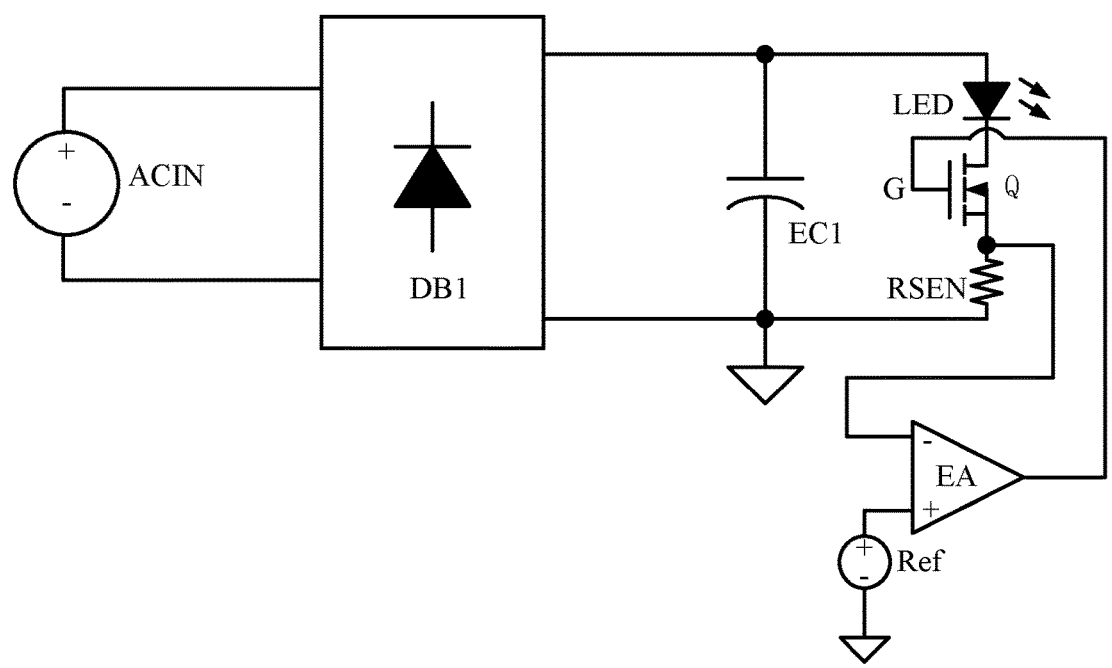
FIG. 1 is a schematic block diagram of an example linear LED driving circuit.

Referring now to FIG. 1, shown is a schematic block diagram of an example linear LED driving circuit. In this example, an input alternate voltage can be rectified by rectifier bridge circuit DB1, in order to generate a direct voltage signal across electrolytic capacitor EC1 to be provided to the light-emitting diode (LED) load and power transistor Q. for example, voltage signal Ref can represent an average value of an LED current. The linearity of power transistor Q can be controlled by an error between voltage signal Ref and a sensing voltage signal that is generated by sensing a current of sensing resistor RSEN. In this way, the LED current may be controlled to be constant. However, because the current flowing through power transistor Q may be consistent with (e.g., the same as) that of the LED load, power losses generated by sensing resistor RSEN and the on-resistance of power transistor Q may result in decreased efficiency.

In one embodiment, a control circuit for an LED driving circuit having a rectifier and a power transistor for driving an LED load, can include: (i) a control signal regulation circuit configured to control a driving voltage of the power transistor to vary with a rectifier output voltage to control the variation of a current flowing through the power transistor to be consistent with that of the rectifier output voltage to decrease a power loss of the power transistor; and (ii) the control signal regulation circuit being configured to control the driving voltage of the power transistor to vary with the rectifier output voltage to control the variation of the current flowing through the power transistor to be opposite to that of the rectifier output voltage to improve a power factor of the LED driving circuit.

Figure 2:
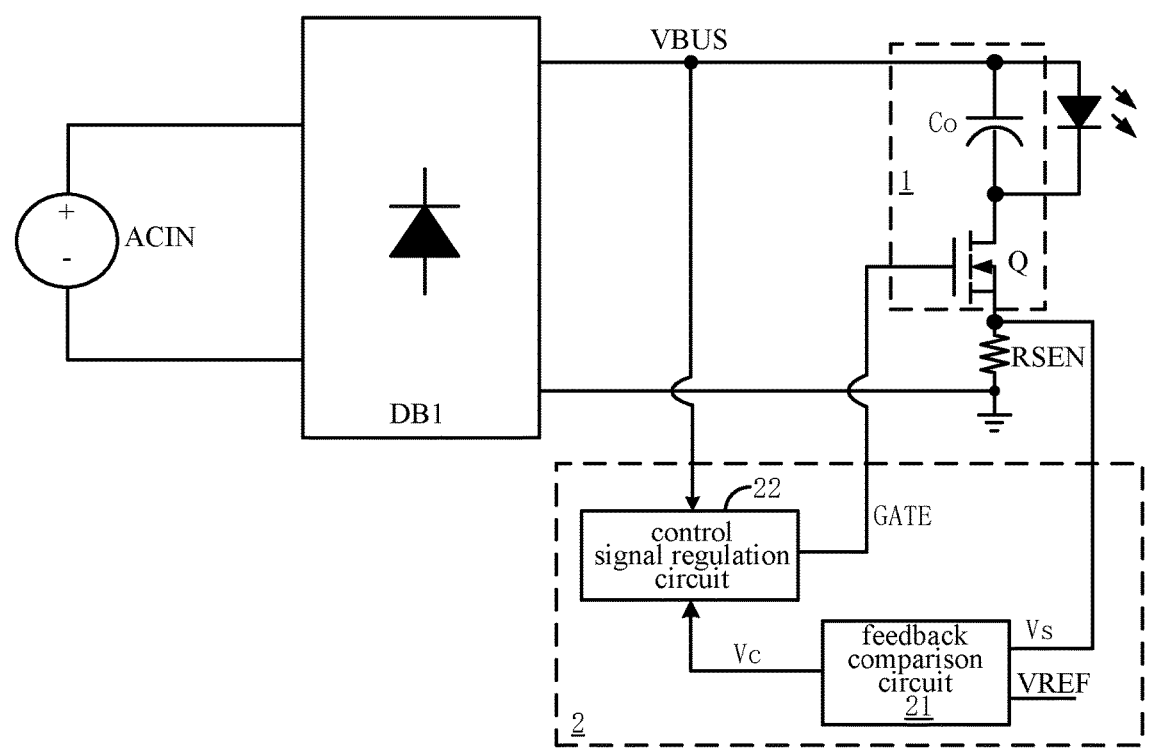
FIG. 2 is a schematic block diagram of a first example linear LED driving circuit, in accordance with embodiments of the present invention.

Referring now to FIG. 2, shown is a schematic block diagram of a first example linear LED driving circuit, in accordance with embodiments of the present invention. In this particular example, rectifier bridge circuit DB1 can convert the received alternating voltage ACIN to bus voltage VBUS, which may be configured as a sinusoidal half wave direct voltage signal. Linear LED driving circuit 1 can be coupled between rectifier bridge circuit DB1 and the LED load. LED driving circuit 1 can include output capacitor Co in parallel with the LED load and power transistor Q, where power transistor Q can be coupled in series with the LED load. The common node between output capacitor Co and the LED load (e.g., the positive terminal of output capacitor Co) can connect to the positive output terminal of rectifier bridge circuit DB1 in order to receive bus voltage VBUS. Power transistor Q can connect between the cathode of the LED load and the negative output terminal of rectifier bridge circuit DB1.

Alternatively, power transistor Q can be coupled between the positive output terminal of rectifier bridge DB1 and the anode electrode of LED load, or in any other suitable series connection with the LED load. Power transistor Q can be controlled by control circuit 2. Gate driving voltage GATE can be controlled by control circuit 2 in order to vary with bus voltage VBUS. Therefore, the variation of current flowing through power transistor Q can be the opposite to the variation of bus voltage VBUS, in order to decrease power losses of power transistor Q. Alternatively, an average current flowing through power transistor Q can be controlled to be consistent with (e.g., the same as) an expected value by simultaneously driving voltage GATE of control circuit 2.

Control circuit 2 can include feedback comparison circuit 21 and control signal regulation circuit 22. Feedback comparison circuit 21 can generate compensation voltage signal Vc in accordance with sampling voltage signal Vs that represents the current flowing through power transistor Q, and reference voltage signal VREF. Compensation voltage signal Vc may represent error information between sampling voltage signal Vs and reference voltage signal VREF. Also, reference voltage signal VREF can represent an expected value of a driving current of LED load. Sampling voltage signal Vs may represent an average value of the current flowing through the LED load. For example, sampling voltage signal Vs can be obtained through sampling resistor RSEN coupled in series with the LED load and power transistor Q.

Control signal regulation circuit 22 can generate driving voltage signal GATE in accordance with compensation voltage signal Vc and bus voltage VBUS. In one example, driving voltage signal GATE can be generated in accordance with compensation voltage signal Vc and a voltage signal that represents bus voltage VBUS by control signal regulation circuit 22 to control the current flowing through power transistor Q. In another example, driving voltage signal GATE can be generated in accordance with another voltage signal that represents compensation voltage signal Vc and the voltage signal that represents bus voltage VBUS.

In accordance with FIG. 2, the amplitude of the voltage signal that represents bus voltage VBUS (e.g., V1) can be in direct proportion with bus voltage VBUS, and the polarity of voltage signal V1 and bus voltage VBUS may be opposite to each other. The variation of the current flowing through power transistor Q can be opposite to that of bus voltage VBUS because driving voltage signal GATE can be generated in accordance with voltage signal V1. In the first half period of half power frequency period of bus voltage VBUS, current flowing through power transistor Q may be gradually decreased while bus voltage VBUS is gradually increased. In the last half period of half power frequency period of bus voltage VBUS, current flowing through power transistor Q can be gradually increased while bus voltage VBUS is gradually decreased. Therefore, the driving current of the LED load may be regulated in accordance with the variation of bus voltage VBUS. The average value of the current flowing through the LED load can be controlled to meet the requirement, and when bus voltage VBUS is greater than a given requirement, the current flowing through power transistor Q may be decreased in order to decrease power losses of power transistor Q to improve efficiency.

Figure 3:
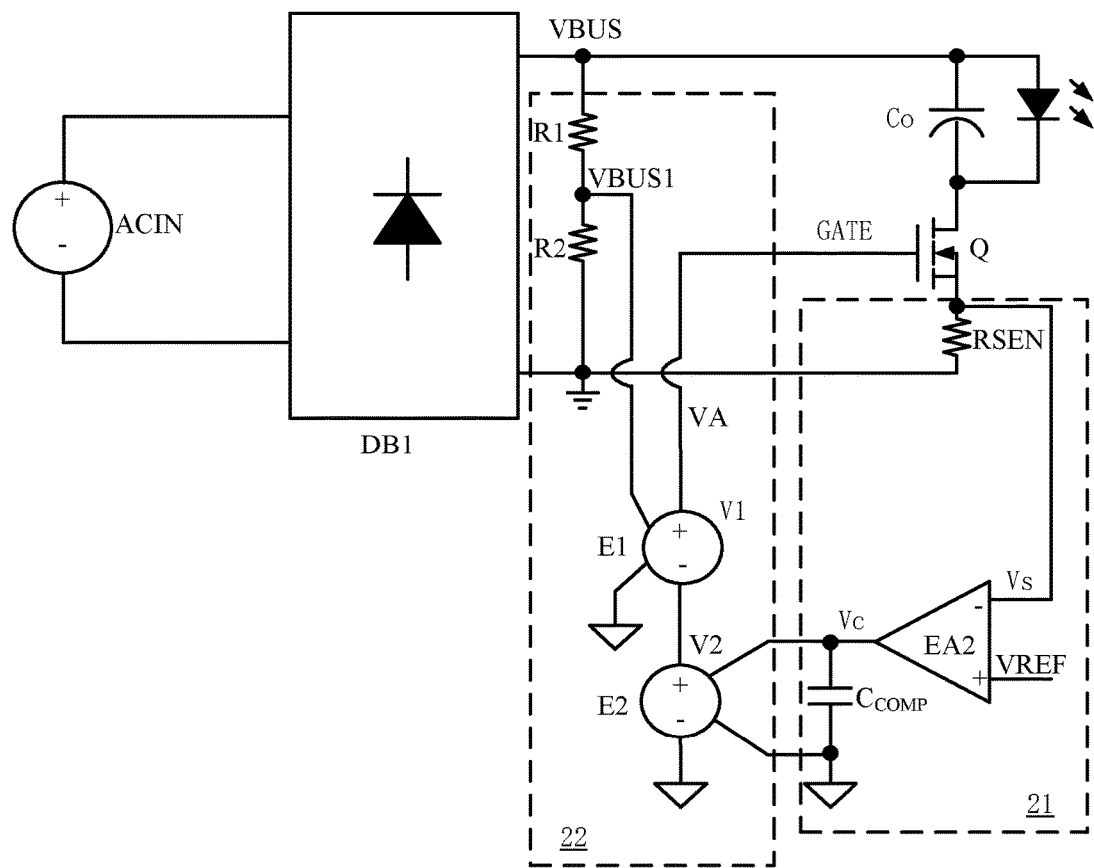
FIG. 3 is a schematic block diagram of a second example linear LED driving circuit, in accordance with embodiments of the present invention.
Figure 4:
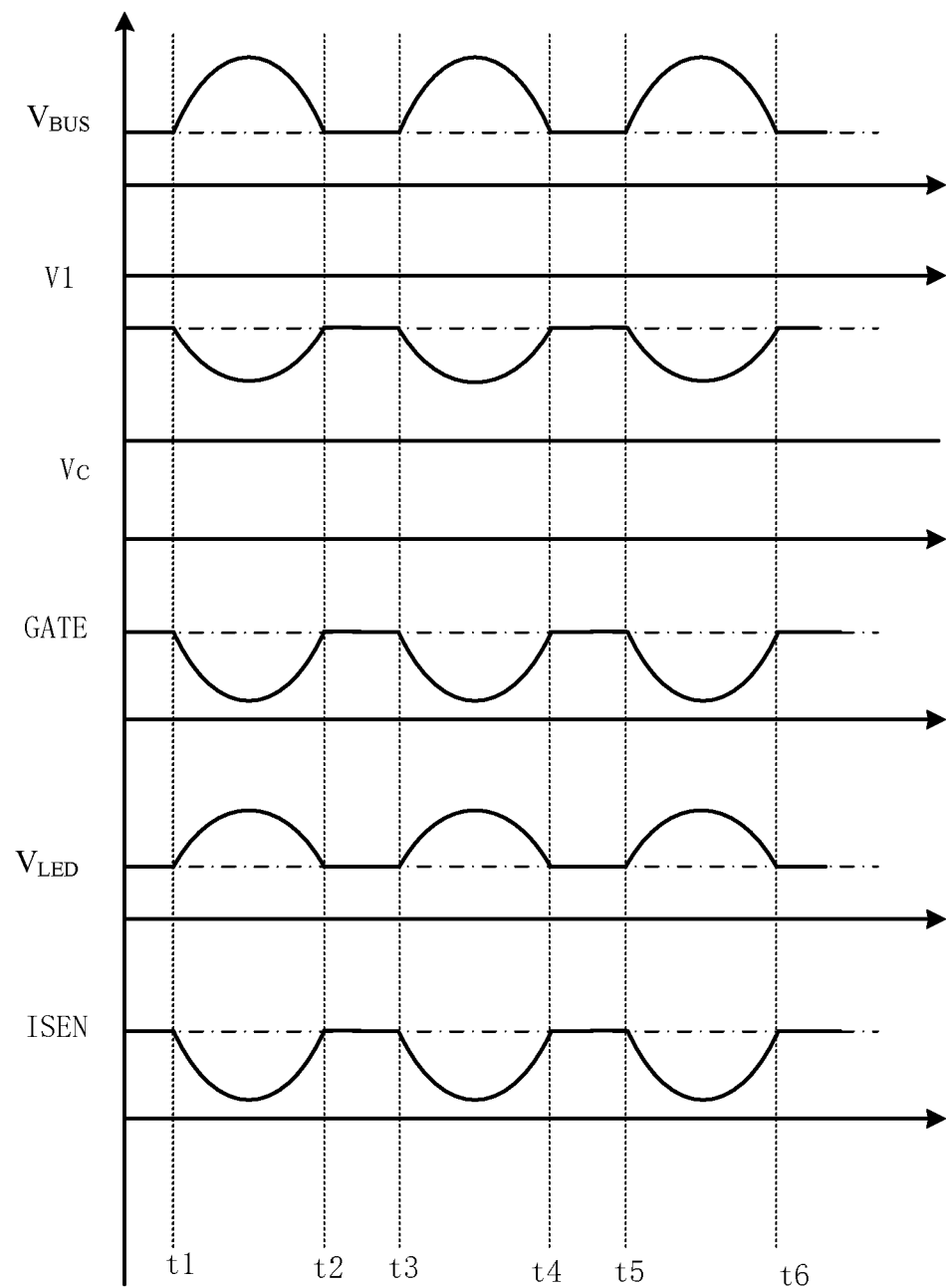
FIG. 4 is a waveform diagram of example operation of the linear LED driving circuit of FIG. 3, in accordance with the embodiments of the present invention.

Referring now to FIG. 3, shown is a schematic block diagram of a second example linear LED driving circuit, in accordance with embodiments of the present invention. Also referring to FIG. 4, shown is a waveform diagram of example operation of the linear LED driving circuit of FIG. 3, in accordance with the embodiments of the present invention. In the particular example of FIG. 3, feedback compensation circuit 21 can include sensing resistor RSEN, error amplifier EA2, and compensation capacitor $C_{COMP}$. Sensing resistor RSEN can be used sample the current flowing through power transistor Q, and to generate sensing voltage signal Vs that represents the current flowing through power transistor Q. Error amplifier EA2 can generate an error signal in accordance with sensing voltage signal Vs at its inverting input terminal and reference voltage signal VREF at its non-inverting input terminal. In addition, the error signal can be compensated by compensation capacitor $C_{COMP}$ in order to generate compensation voltage signal Vc. Compensation capacitor $C_{COMP}$ can be configured as a bulk capacitor to average the error signal, and to substantially eliminate power frequency ripples.

As shown in FIG. 3, control signal regulation circuit 22 can include a voltage divider resistance network (e.g., resistors R1 and R2 connected in series) and a first voltage conversion circuit. For example, the first voltage conversion circuit can be configured as voltage-controlled voltage source E1. The voltage divider resistance network can connect between the two output terminals of rectifier bridge DB1, and may be configured to generate voltage divider signal VBUS1 at the common node between resistors R1 and R2 in accordance with bus voltage VBUS. Voltage-controlled voltage source E1 can convert voltage divider signal VBUS1 to voltage signal V1 with an opposite variation to bus voltage VBUS. For example, the amplitude of voltage signal V1 can be in direct proportion with that of bus voltage VBUS, and the polarity of voltage signal V1 may be opposite to that of bus voltage VBUS. The waveform of voltage signal V1 may be as shown in FIG. 4, and in one half of the power frequency period (e.g., from t1 to t2), the variation of voltage signal V1 may be opposite to that of bus voltage VBUS.

One skilled in the art will recognize that the configuration of the first voltage conversion circuit described above is not limited to voltage-controlled voltage source, and other suitable circuit configurations can also be applied (e.g., a circuit including proportion conversion circuit and a polarity conversion circuit). In addition, control signal regulation circuit 22 can also include a second voltage conversion circuit, which may be configured as voltage-controlled voltage source E2. In addition, voltage-controlled voltage source E2 can convert compensation voltage signal Vc to voltage signal V2. The amplitude of voltage signal V2 may be in direct proportion to that of compensation voltage signal Vc, and the polarity of voltage signal V2 can be same as that of compensation voltage signal Vc. For example, voltage signal Vc can be arranged to be K*Vc, where K is between 0 and 1.

In the example of FIG. 3, voltage-controlled voltage source E2 can be coupled in series with voltage-controlled voltage source E1. For example, the negative terminal of voltage-controlled voltage source E1 can connect to the positive terminal of voltage-controlled voltage source E2. Therefore, voltage signals V1 and V2 may be added to generate an addition signal to control gate voltage GATE of power transistor Q. in another example, voltage-controlled voltage source E1 can directly receive compensation voltage signal Vc. The sum of compensation voltage signal Vc and voltage signal V1 may be configured to control the gate voltage GATE of power transistor Q. The waveform of compensation signal Vc can generally be shaped as a steady and straight line. Also, driving voltage GATE may have a similar waveform to that of voltage signal V1.

In operation, power transistor Q can operate in a linear mode, and the current flowing through power transistor Q may be controlled by driving voltage GATE. As shown in FIG. 4, the waveforms of sensing current ISEN and driving voltage GATE are the same and have an opposite variation to that of bus voltage VBUS. When bus voltage VBUS is less than load voltage $V_{LED}$, no current may flow through the LED load. Also, when bus voltage VBUS is larger than load voltage $V_{LED}$, current flowing through the LED load can be controlled by control signal regulation circuit 22.

As shown in FIG. 4, when bus voltage VBUS is greater than a given requirement, the current flowing through power transistor Q can be controlled to be lower, in order to decrease the on-resistance power loss. Although the power factor may be decreased in this implementation, voltage signal V1 can be adjusted by adjusting the ratio between resistors R1 and R2, in order to adjust the LED current to achieve a balance between higher efficiency and power factor correction. In this way, when the variation of voltage signal V1 is controlled to be consistent with bus voltage VBUS, the variation of current flowing through power transistor Q can be consistent with bus voltage VBUS.

Figure 5:
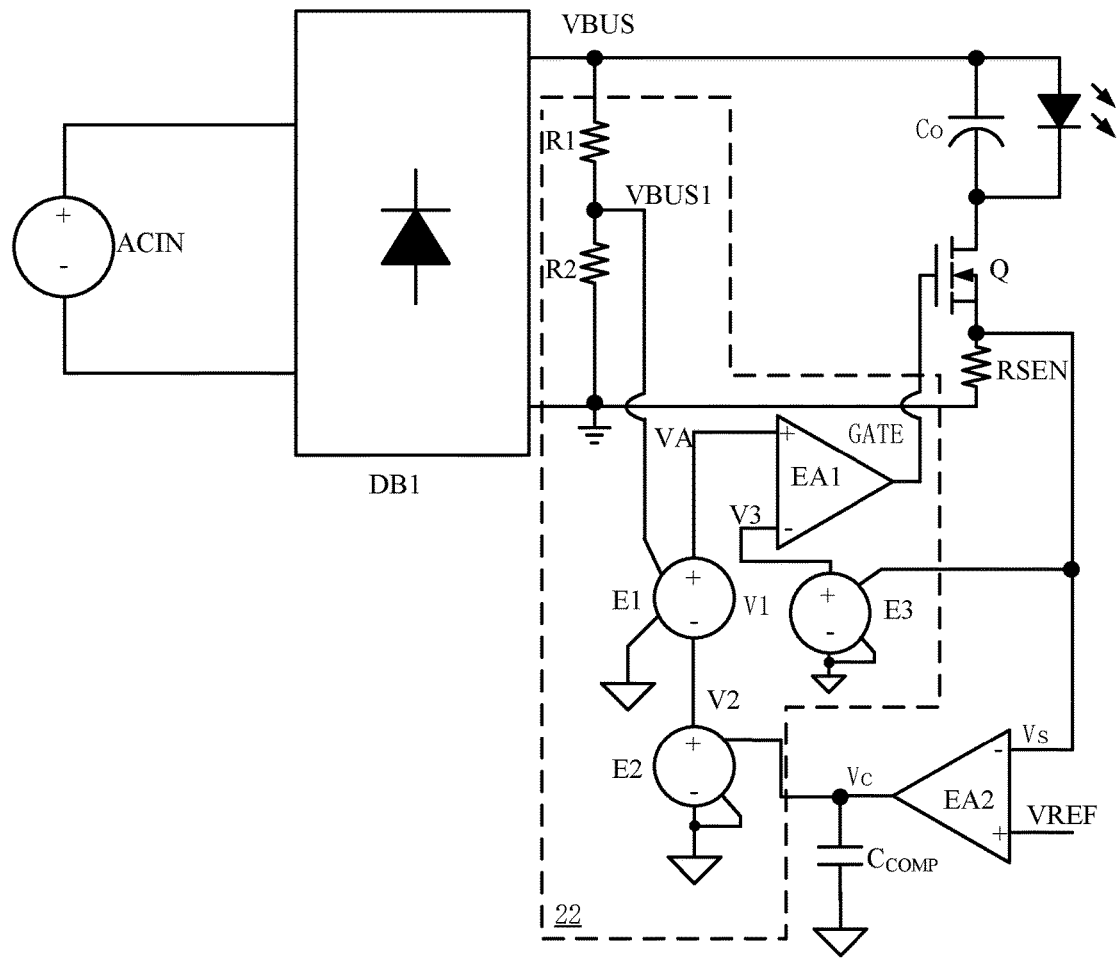
FIG. 5 is a schematic block diagram of a third example linear LED driving circuit, in accordance with embodiments of the present invention.
Figure 6:
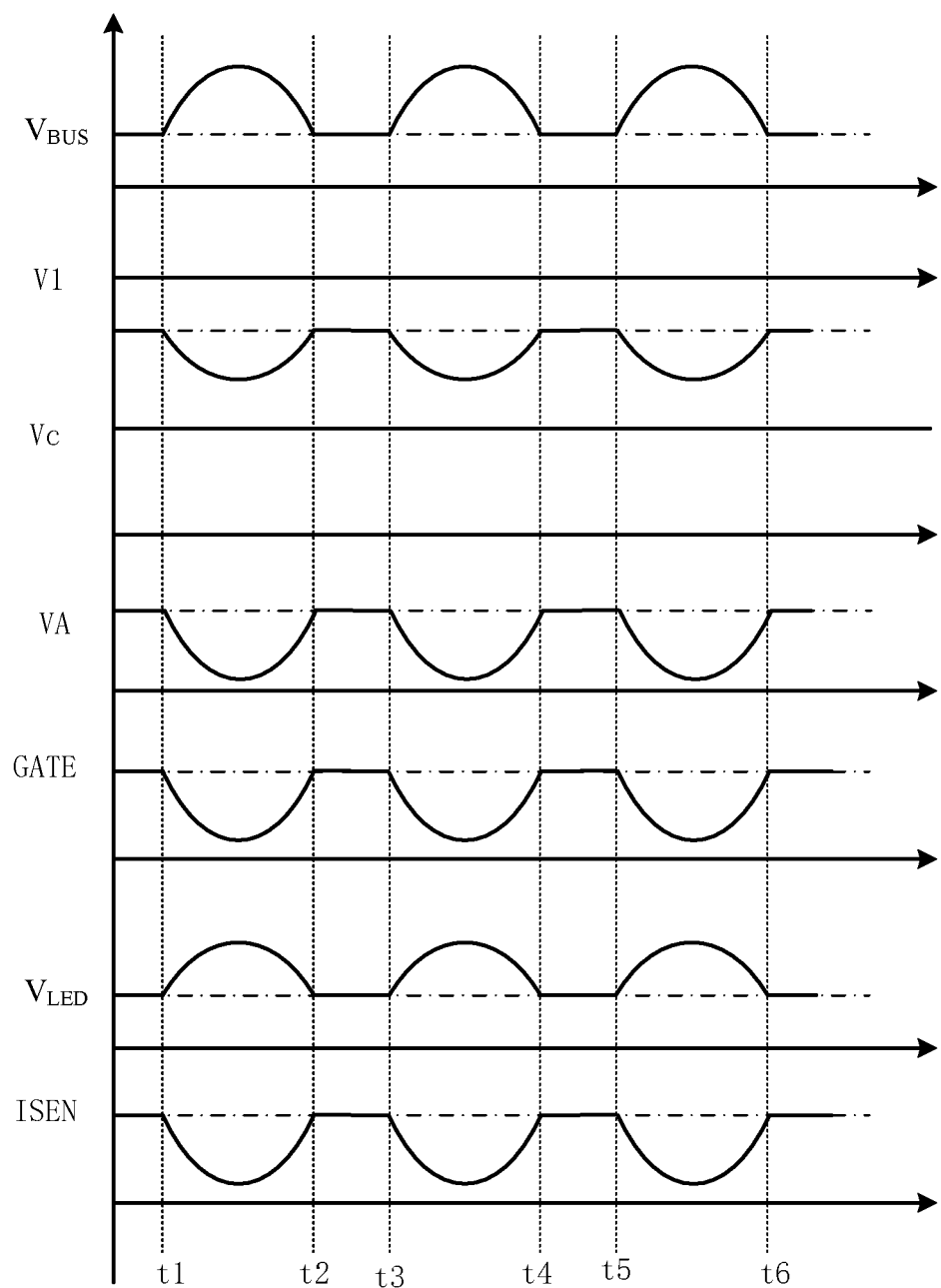
FIG. 6 is a waveform diagram of example operation of the linear LED driving circuit of FIG. 5, in accordance with embodiments of the present invention.

Referring now to FIG. 5, shown is a schematic block diagram of a third example linear LED driving circuit, in accordance with embodiments of the present invention. Also referring to FIG. 6, shown is a waveform diagram of example operation of the linear LED driving circuit of FIG. 5, in accordance with embodiments of the present invention. As compared to the above examples, a third voltage conversion circuit (e.g., voltage-controlled voltage source E3) and error amplifier EA1 are added in this example in control signal regulation circuit 22. Sensing voltage signal Vs can be converted to voltage signal V3 by voltage-controlled voltage source E3. The amplitude of voltage signal V3 can be in direct proportion with that of sensing voltage signal Vs, and the polarity of voltage signal V3 may be consistent with that of sensing voltage signal Vs.

The non-inverting input terminal of error amplifier EA1 can receive sum signal VA by adding compensation signal Vc to voltage signal V1, or by adding voltage signal V2 to voltage signal V1. The inverting input terminal of error amplifier EA1 can receive voltage signal V3. Driving voltage GATE may be generated at the output terminal of error amplifier EA1 that represents the error between sum signal VA and voltage signal V3. The current flowing through power transistor Q can be controlled by driving voltage GATE such that voltage signal V3 follows sum signal VA. Therefore, the variation of the current flowing through power transistor Q can be opposite to that of bus voltage VBUS. In addition, the average value of current flowing through LED load may be consistent with an expected value. A control loop having a faster response can be formed by error amplifier EA1 and the third voltage conversion circuit, such that the current flowing through power transistor Q can be quickly regulated according to the variation of bus voltage VBUS and the LED current.

By the control of error amplifier EA1, the shape of the waveform of the current flowing through power transistor Q can be consistent with sum signal VA, in order to avoid potential problems of reduced LED current control accuracy generated by the variation of parameters (e.g., temperature) of power transistor Q. In this way, power losses of power transistor Q can be decreased in order to improve efficiency. For example, the first, second, and third voltage conversion circuits can be integrated into one die (IC). In addition, the voltage divider resistance network, compensation capacitor, and sensing resistor may be configured as discrete devices that form peripheral circuits of the die.

In particular embodiments, control method for a linear LED driving circuit including a power transistor can include rectifying an alternating voltage signal to generate a sinusoidal half wave direct voltage signal configured as a driving voltage to an LED load. The method can also include generating a first voltage signal (e.g., V1) representing the sinusoidal half wave direct voltage signal (e.g., VBUS). The method can also include generating a driving voltage signal (e.g., GATE) in accordance with the first voltage signal and a compensation voltage signal (e.g., Vc) representing an error between the current flowing through the power transistor (e.g., Q) and an expected value to control current flowing through the power transistor. The method can also include controlling the variation of the current flowing through the power transistor to be consistent with, or opposite to, that of the sinusoidal half wave direct voltage signal in one half of power frequency period.

For example, the variation of the current flowing through the power transistor can be controlled to be opposite to that of the sinusoidal half wave direct voltage signal in one half of power frequency period. For example, the sinusoidal half wave direct voltage signal is converted to a first voltage signal with opposite polarity to the sinusoidal half wave direct voltage signal. For example, the first voltage signal and the compensation voltage signal can be added to form a sum signal (e.g., VA) configured as the driving voltage. For example, the compensation voltage signal can be converted to a second compensation signal in direct proportion with the compensation voltage signal.

For example, the first voltage signal and the second compensation signal can be added to form a sum signal configured as the driving voltage. For example, the sensing voltage signal is converted to a second voltage signal in direct proportion with the sensing voltage signal. The error between the sum signal and the second voltage signal can be calculated amplified to form the driving voltage signal. For example, the LED driving circuit can include an output capacitor (e.g., Co) coupled in parallel with the LED load, which is coupled in series with the power transistor.

In particular embodiments, a control method for a linear LED driving circuit including a power transistor coupled in series with an LED load can include controlling a driving voltage signal of the power transistor to vary with a rectifier output voltage of sinusoidal half waveform, and controlling the variation of a current flowing through the power transistor to be consistent with, or opposite to, the voltage across the power transistor to decrease the power loss and to improve efficiency. The control method can also include controlling the driving voltage of power transistor to make an average value of the current flowing through the power transistor to be consistent with an expected value. For example, the driving voltage of the power transistor may be controlled in accordance with the rectifier output voltage and compensation voltage signal representing an error between the average value of the current flowing through the power transistor and the expected value.

For example, a first voltage signal representing the rectifier output voltage can be generated, and a second voltage signal representing the compensation voltage signal may be generated. The driving voltage may be generated in accordance with the first and second voltage signals. Alternatively, a first voltage signal representing the rectifier output voltage can be generated, and the driving voltage is generated in accordance with the first voltage signal and the compensation voltage signal. For example, the amplitude of the first voltage signal can be in direct proportion with the rectifier output voltage, and the polarity of first voltage signal is consistent with or opposite to the rectifier output voltage. The driving voltage may be generated by adding the first voltage signal to second voltage signal. Alternatively, the driving voltage may be generated by adding the first voltage signal to the compensation voltage signal.

For example, the amplitude of the first voltage signal can be in direct proportion with the rectifier output voltage, and the polarity of first voltage signal may be consistent with or opposite to the rectifier output voltage. The generating the driving voltage can include adding the first voltage signal to the second voltage signal to generate a sum signal, generating a third voltage signal in direct proportion with the current flowing through the power transistor, and generating the driving voltage in accordance with an error between the sum signal and the third voltage signal (e.g., V3). In another example, generating the driving voltage can include adding the first voltage signal to compensation voltage signal to generate a sum signal, generating a third voltage signal in direct proportion with the current flowing through the power transistor, and generating the driving voltage in accordance with an error between the sum signal and the third voltage signal.

In this way the variation of the current flowing through the power transistor can be controlled to be consistent with or opposite to the voltage across the power transistor by controlling the driving voltage of the power transistor to vary with the rectifier output voltage. Therefore, the variation of current flowing through the power transistor can be consistent with or opposite to the rectifier output voltage. When opposite, the current may be lower while the voltage across the power transistor is greater, in order to decrease the power loss of power transistor. When consistent with, the power factor of the LED driving circuit may be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a light-emitting diode (LED) driving circuit having a rectifier and a power transistor for driving an LED load, the control circuit comprising:
   a) a control signal regulation circuit configured to control a driving voltage of said power transistor to vary with a rectifier output voltage to control the variation of a current flowing through said power transistor to be consistent with that of said rectifier output voltage to decrease a power loss of said power transistor; and
   b) said control signal regulation circuit being configured to control said driving voltage of said power transistor to vary with said rectifier output voltage to control the variation of said current flowing through said power transistor to be opposite to that of said rectifier output voltage to improve a power factor of said LED driving circuit.

2. The control circuit of claim 1, wherein said control signal regulation circuit is configured to control said driving voltage to control an average value of said current flowing through said power transistor to be consistent with an expected value.

3. The control circuit of claim 2, wherein said control signal regulation circuit is configured to control said driving voltage in accordance with said rectifier output voltage and a compensation voltage signal that represents an error between said average value and said expected value.

4. The control circuit of claim 3, wherein said control signal regulation circuit is configured to:
   a) generate a first voltage signal that represents said rectifier output voltage;
   b) generate a second voltage signal that represents said compensation voltage signal; and
   c) generate said driving voltage in accordance with said first and second voltage signals, or in accordance with said first voltage signal and said compensation voltage signal.

5. The control circuit of claim 4, wherein said control signal regulation circuit comprises:
   a) a voltage divider resistance network configured to divide said rectifier output voltage to generate a first voltage divider signal; and
   b) a first voltage conversion circuit configured to generate said first voltage signal in direct proportion or inverse proportion with said rectifier output voltage by converting said first voltage divider signal.

6. The control circuit of claim 5, wherein said control signal regulation circuit comprises:
   a) a second voltage conversion circuit coupled in series with said first conversion circuit, and being configured to generate a second voltage signal in direct proportion with said compensation voltage signal; and
   b) wherein a sum signal is generated at one terminal of a series connection of said first and second conversion circuits, or by adding said first voltage signal to said compensation voltage signal.

7. The control circuit of claim 6, wherein said sum signal is configured as said driving voltage to control said power transistor.

8. The control circuit of claim 6, wherein said control signal generation circuit comprises:
   a) a third voltage conversion circuit configured convert a sensing voltage signal that represents the current flowing through said power transistor to a third voltage signal in direct proportion with said sensing voltage signal; and
   b) a first error amplifier configured to generate said driving voltage in accordance with said sum signal and said third voltage signal.

9. The control circuit of claim 1, wherein said control circuit comprises a feedback comparison circuit configured to generate said compensation voltage signal in accordance with a sensing voltage signal that represents said current flowing through said power transistor, and a reference voltage signal that represents an expected value of current flowing through said LED load.

10. The control circuit of claim 9, wherein said feedback comparison circuit comprises:
    a) a second error amplifier configured to generate said compensation voltage signal in accordance with said sensing voltage signal and said reference voltage signal; and
    b) a compensation circuit coupled between an output of said second error amplifier and ground.

11. The control circuit of claim 1, wherein said rectifier output voltage is configured as a sinusoidal half wave direct voltage signal.

12. The control circuit of claim 1, wherein an anode of said LED load is connected to said rectifier output voltage, a cathode of said LED load is connected to a drain of said power transistor, a source of said power transistor is connected to a first terminal of a sensing resistor, and a second terminal of said sensing resistor is connected to ground.

13. A control method for a light-emitting diode (LED) driving circuit having a rectifier and a power transistor for driving an LED load, the method comprising:
    a) controlling, by a control signal regulation circuit, a driving voltage of said power transistor to vary with a rectifier output voltage to control the variation of a current flowing through said power transistor to be consistent with that of said rectifier output voltage to decrease a power loss of said power transistor; and
    b) controlling, by said control signal regulation, said driving voltage of said power transistor to vary with said rectifier output voltage to control the variation of said current flowing through said power transistor to be opposite to that of said rectifier output voltage to improve a power factor of said LED driving circuit.

14. The method of claim 13, further comprising controlling said driving voltage of said power transistor to control an average value of current flowing through said power transistor to be consistent with an expected value.

15. The method of claim 14, further comprising controlling said driving voltage in accordance with said rectifier output voltage and a compensation voltage signal representing an error between said average value and said expected value.

16. The method of claim 15, wherein said controlling said driving voltage comprises:
   a) generating a first voltage signal representing said rectifier output voltage;
   b) generating a second voltage signal representing said compensation voltage signal; and
   c) generating said driving voltage in accordance with said first and second voltage signals, or in accordance with said first voltage signal and said compensation voltage signal.

17. The method of claim 16, wherein said first voltage signal is in direct proportion with said rectifier output voltage, and said generating said driving voltage comprises adding said first voltage signal to said second voltage signal.

18. The method of claim 16, wherein said first voltage signal is in inverse proportion with said rectifier output voltage, and said generating said driving voltage comprises adding said first voltage signal to said compensation voltage signal.

19. The method of claim 16, wherein said generating said driving voltage comprises:
   a) adding said first voltage signal to said second voltage signal to generate a sum signal;
   b) sensing current flowing through said power transistor to generate a sensing voltage signal;
   c) converting said sensing voltage signal to generate a third voltage signal in direct proportion with said sensing voltage signal; and
   d) generating said driving voltage in accordance with an error between said sum signal and said third voltage signal.

20. The method of claim 16, wherein said generating said driving voltage comprises:
   a) adding said first voltage signal to said compensation voltage signal to generate a sum signal;
   b) sensing current flowing through said power transistor to generate a sensing voltage signal;
   c) converting said sensing voltage signal to generate a third voltage signal in direct proportion with said sensing voltage signal; and
   d) generating said driving voltage in accordance with an error between said sum signal and said third voltage signal.

* * * * *